United States Patent
Kowa et al.

(10) Patent No.: US 6,702,137 B1
(45) Date of Patent: *Mar. 9, 2004

(54) PLUG STRUCTURE FOR LIQUID CONTAINER

(75) Inventors: Yasuhiro Kowa, Tokyo (JP); Takashi Ohno, Tokyo (JP); Ikuo Miura, Tokyo (JP)

(73) Assignee: Nippon Sanso Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/826,783

(22) Filed: Apr. 4, 2001

(51) Int. Cl.$^7$ ................................................ B65D 51/18
(52) U.S. Cl. ................................ 220/254.5; 220/254.1; 220/254.3; 220/259.1; 220/259.3; 220/847; 220/713; 220/367.1; 215/235; 222/556
(58) Field of Search ............................ 215/235, 237, 215/387; 220/254.1, 254.3, 254.5, 255, 789, 790, 792, 795, 326, 831–834, 847, 836, 848, 259.1, 259.3, 711, 715, 713, 717, 718, 367.1, 214; 222/556, 484, 153.01

(56) References Cited

U.S. PATENT DOCUMENTS

| | | | | |
|---|---|---|---|---|
| 2,649,225 A | * | 8/1953 | Jobson | 222/505 |
| 3,059,816 A | * | 10/1962 | Goldstein | 215/235 |
| 3,655,102 A | * | 4/1972 | Moran | 222/484 |
| 3,964,631 A | * | 6/1976 | Albert | 220/715 |
| 4,503,991 A | * | 3/1985 | Joyce | 220/838 |
| 4,773,550 A | * | 9/1988 | Ekkert | 215/206 |
| 5,141,138 A | * | 8/1992 | Odet et al. | 215/235 |
| 5,148,936 A | * | 9/1992 | DeGrow | 220/254.3 |
| 5,169,016 A | * | 12/1992 | Hinz, Jr. | 222/506 |
| 5,456,380 A | * | 10/1995 | Ito et al. | 220/713 |
| 5,746,338 A | * | 5/1998 | Takahashi et al. | 215/237 |
| 5,944,235 A | * | 8/1999 | Won | 222/506 |
| 6,116,476 A | * | 9/2000 | Huang | 222/506 |
| 6,170,693 B1 | * | 1/2001 | Goto | 220/256.1 |

FOREIGN PATENT DOCUMENTS

| | | |
|---|---|---|
| JP | 09-215610 | 8/1997 |
| JP | 11-155745 | 6/1999 |

\* cited by examiner

*Primary Examiner*—Robin Hylton
(74) *Attorney, Agent, or Firm*—J.C. Patents

(57) ABSTRACT

A plug for a liquid container comprises an outer plug, an inner plug and a fixing device. The outer plug is substantially a cylinder shape with a bottom wall and detachably installed onto a liquid container, wherein a liquid passage hole is penetrated through the bottom wall, and a liquid passage is formed between the bottom wall and an upper opening of the outer plug body. The inner plug is pivotally connected to the outer plug through a hinge, wherein the inner plug further comprises a liquid inlet seal member for sealing the liquid passage hole and a liquid outlet seal member for sealing an inner wall near the upper opening of the outer plug. The fixing device is used for fixing the inner plug onto the outer plug.

2 Claims, 5 Drawing Sheets

PLUG STRUCTURE FOR LIQUID CONTAINER

BACKGROUND OF THE INVENTION

This application incorporates by reference Japanese application Ser. No. P11-341188, filed Nov. 30, 1999, P11-341189, filed Nov. 30, 1999, and 11-341190, filed Nov. 30, 1999.

1. Field of the Invention

The present invention relates to a plug structure. More particularly, the present invention relates to a plug structure for a liquid container, such as a thermos bottle.

2. Description of the Related Art

In general, a portable liquid container, such as a water bottle or a thermos bottle, usually comprises a plug structure installed onto the upper opening of the liquid container for cutting off water and providing passages to pour or remove liquid. Recently, a newer plug structure that doesn't have to be removed before pouring or removing liquid has been widely used. For example, a so-called one-touch plug has been disclosed for such purpose and function by a Japanese Patent Laid-open Publication No. 9-215610. The one-touch plug comprises a plug member composed of an inner cylinder and an outer cylinder, a valve guide, a valve and a flap. The plug member has a liquid passage that is formed between the inner and the outer cylinders for connecting a liquid outlet formed on the top end of the inner cylinder and a liquid inlet formed on the bottom end of the outer cylinder. The valve guide can be moved up and down by pushing a button installed on the plug member. The valve is installed on the front end of the valve guide for opening and closing the liquid inlet of the liquid passage. The flap is connected to the button and is synchronized with the valve for opening and closing the liquid outlet of the liquid passage. The one-touch plug further comprises a water cut-off mechanism, which has a seal member installed on the bottom end of the outer cylinder to seal the top of the valve, thereby the liquid inlet of the liquid passage is sealed.

The water cut-off mechanism mentioned above is formed only on a position where the liquid inlet locates and the required water cut-off location is widely spread. Therefore the pressure acted on the water cut-off location is not uniform if one of the parts, such as the bottom of the outer cylinder, the sealed member, or the valve are tilted or distorted. Additionally, when the plug is closed after finishing pouring liquid to the container, a little liquid remains along the liquid passage, and the residue liquid leaks from a gap between the flap, and the liquid outlet. For solving the problem as mentioned above, a Japanese Patent Laid-open Publication, JP 11-155745, discloses a plug structure where another sealed member is formed on the flap or the liquid outlet, by which both the liquid inlet and outlet can prevent liquid from leakage.

However, because the liquid outlet on the inner cylinder and the liquid inlet on the outer cylinder are formed individually, the liquid passage structure becomes complex so that it is hard to completely clean up the liquid passage.

In addition, because the movements of the valve for opening or closing the liquid passage utilize a push button formed on the plug member, the mechanism for opening and closing operation is vertically performed, causing the overall height of the plug to become higher. Furthermore, when the liquid passage is opened, the valve is moved into the liquid container. Because the temperature in the liquid container is higher than outside, the pressure in the liquid container is higher than outside, and therefore a larger force is required for opening the liquid passage.

However, the proposed structure is complex and costly. In addition, because the liquid is cut off from the bottom of the liquid inlet and from the top of the outlet, the cut-off pressures acted on the liquid inlet and outlet must be the same but it is difficult to adjust. Moreover, because the valve will move downwards when the plug is opened, when hot water is poured into the container, the vapor due to the hot water causes the pressure in the container to be higher than the outside environment, and thus it requires a larger force to open the plug.

SUMMARY OF THE INVENTION

Accordingly, it is an object of the invention to provide a plug structure for a liquid container, such as a water bottle or a thermos bottle, capable of easily cleaning up a liquid passage of the plug structure.

It is another object of the invention to provide a plug structure for a liquid container such that the overall height of the plug structure can be reduced and the open and close operation of the plug structure can be eased.

It is still another object of the invention to provide a plug structure for a liquid container such that a simple water cut-off structure is used for preventing the liquid inlet and outlet from leakage.

To achieve these and other advantages and in accordance with the purpose of the invention, as embodied and broadly described herein, the invention provides a plug structure for a liquid container, comprising an outer plug, an inner plug and a fixing device. The outer plug is substantially a cylinder shape with a bottom wall and detachably installed onto a liquid container, wherein the bottom wall is tilted, and a liquid passage hole, and an air hole are penetrated through the bottom wall and are respectively located on a lower position and a higher position of the bottom wall. A liquid passage is formed between the bottom wall and an upper opening of the outer plug body. The inner plug is pivotally connected to the outer plug through a hinge for opening or closing the outer plug, wherein the inner plug further comprises seal members thereon for sealing the liquid passage hole and the air hole respectively. The fixing device is used for securing the inner plug onto the outer plug, wherein the fixing device is installed on the inner plug, and moved back and forth on the inner plug.

The invention further provides a plug for a liquid container, comprising an outer plug, an inner plug, and a fixing device. The outer plug is substantially a cylinder shape with a bottom wall, and detachably installed onto a liquid container, wherein a liquid passage hole is penetrated through the bottom wall, and a liquid passage is formed between the bottom wall and an upper opening of the outer plug body. The inner plug is pivotally connected to the outer plug through a hinge for opening or closing the outer plug, wherein the inner plug further comprises a seal member thereon for sealing the liquid passage hole. The fixing device is used for securing the inner plug onto the outer plug, wherein the fixing device protrudes from a sidewall of the inner plug, and has a fixing claw for fixing the inner plug to an inner wall of the outer plug, wherein the fixing device is formed on the inner plug and moved back and forth along a protrusion direction of the fixing claw.

The invention also provides a plug for a liquid container, comprising an outer plug, an inner plug, and a fixing device. The outer plug is substantially a cylinder shape with a bottom wall and detachably installed onto a liquid container, wherein a liquid passage hole is penetrated through the bottom wall, and a liquid passage is formed between the bottom wall, and an upper opening of the outer plug body. The inner plug is pivotally connected to the outer plug through a hinge for opening or closing the outer plug, wherein the inner plug further comprises a liquid inlet seal member for sealing the liquid passage hole, and a liquid outlet seal member for sealing an inner wall near the upper opening of the outer plug. The fixing device is used for fixing the inner plug onto the outer plug. In addition, a hole is located between the liquid inlet seal member, and the inner plug, such that the hole is connected to the outside of the plug.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENTS

Figure 1:
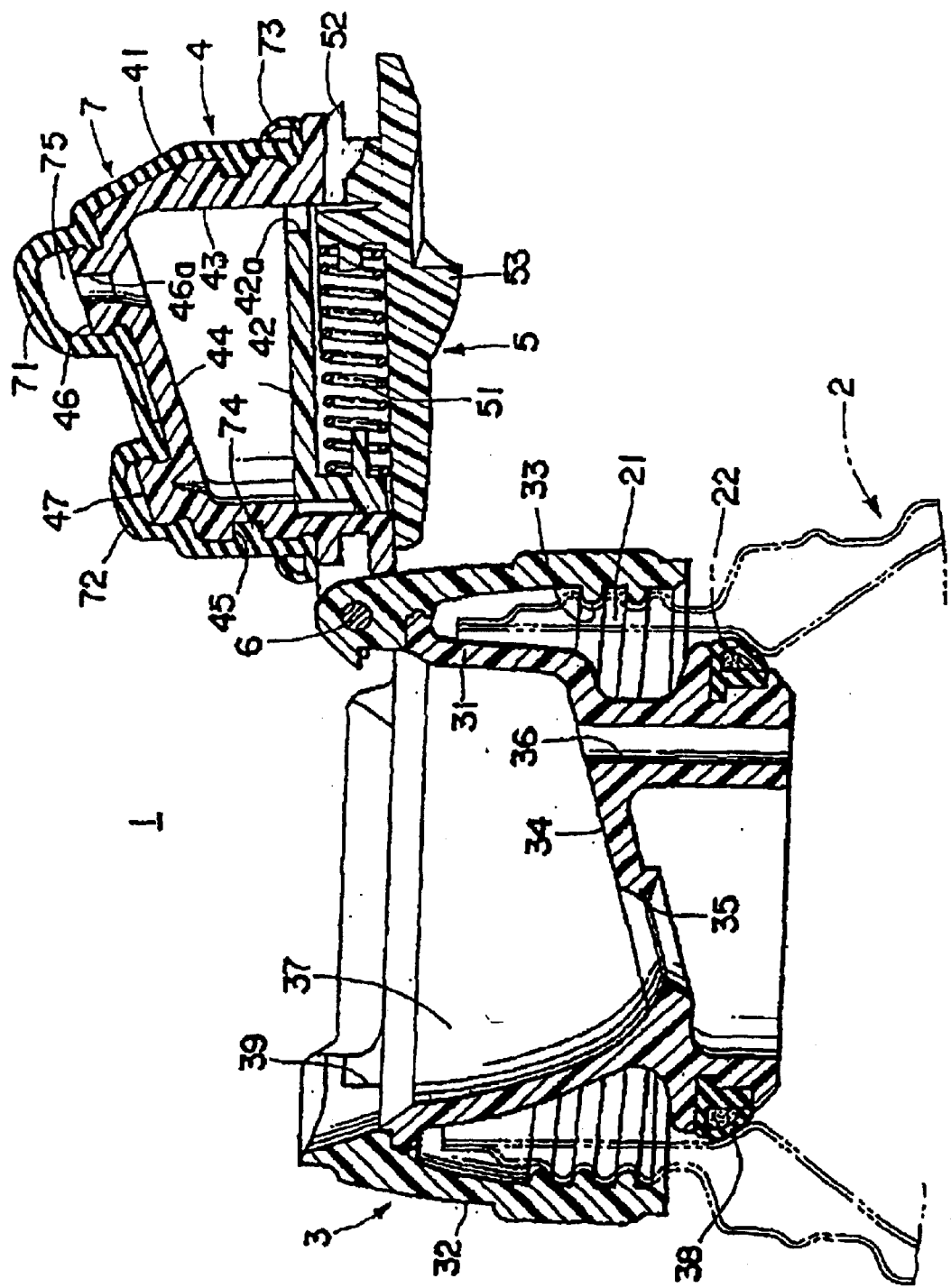
FIG. 1 is a cross-sectional view of a plug in an open status according to one preferred embodiment of the invention.
Figure 2:
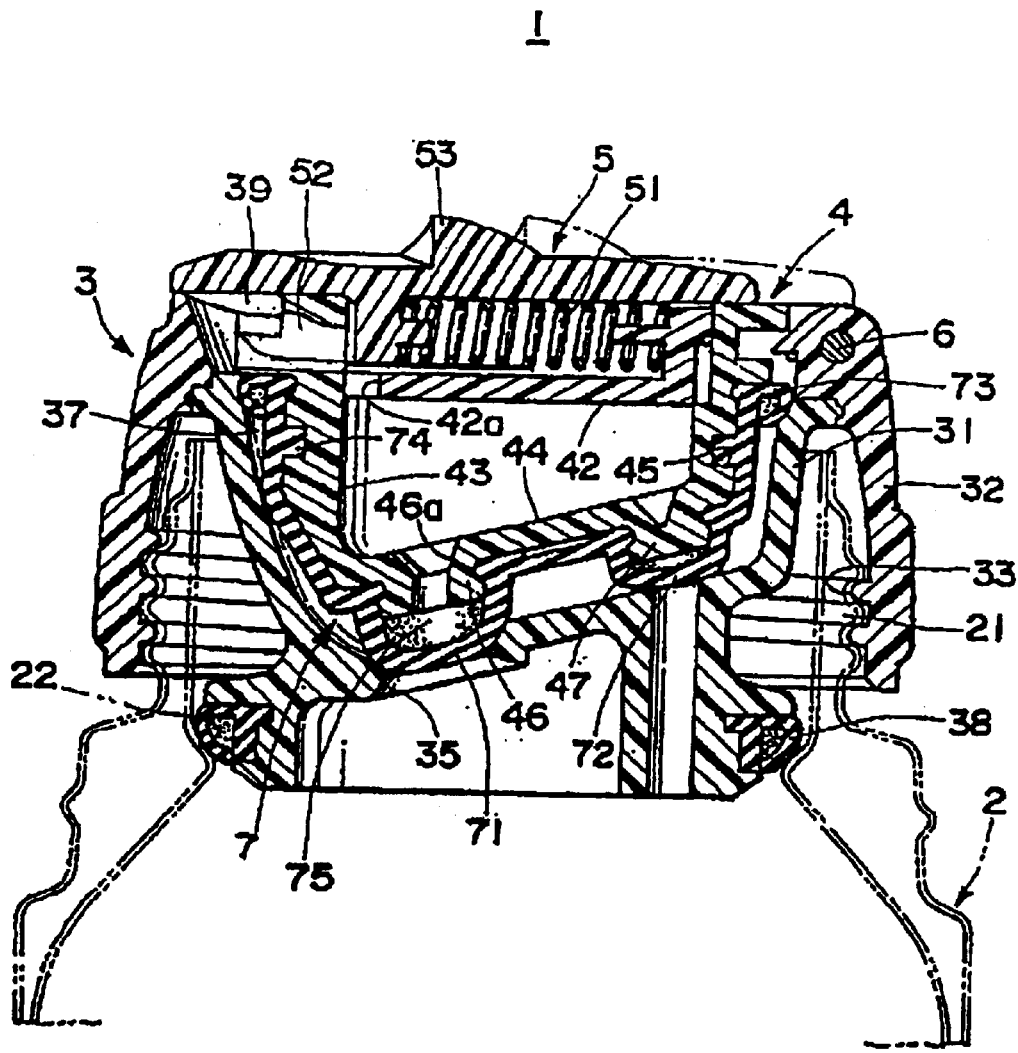
FIG. 2 is a cross-sectional view of the plug in a closed status using a fixing device to fix the inner plug onto the outer plug according to one preferred embodiment of the invention.
Figure 3:
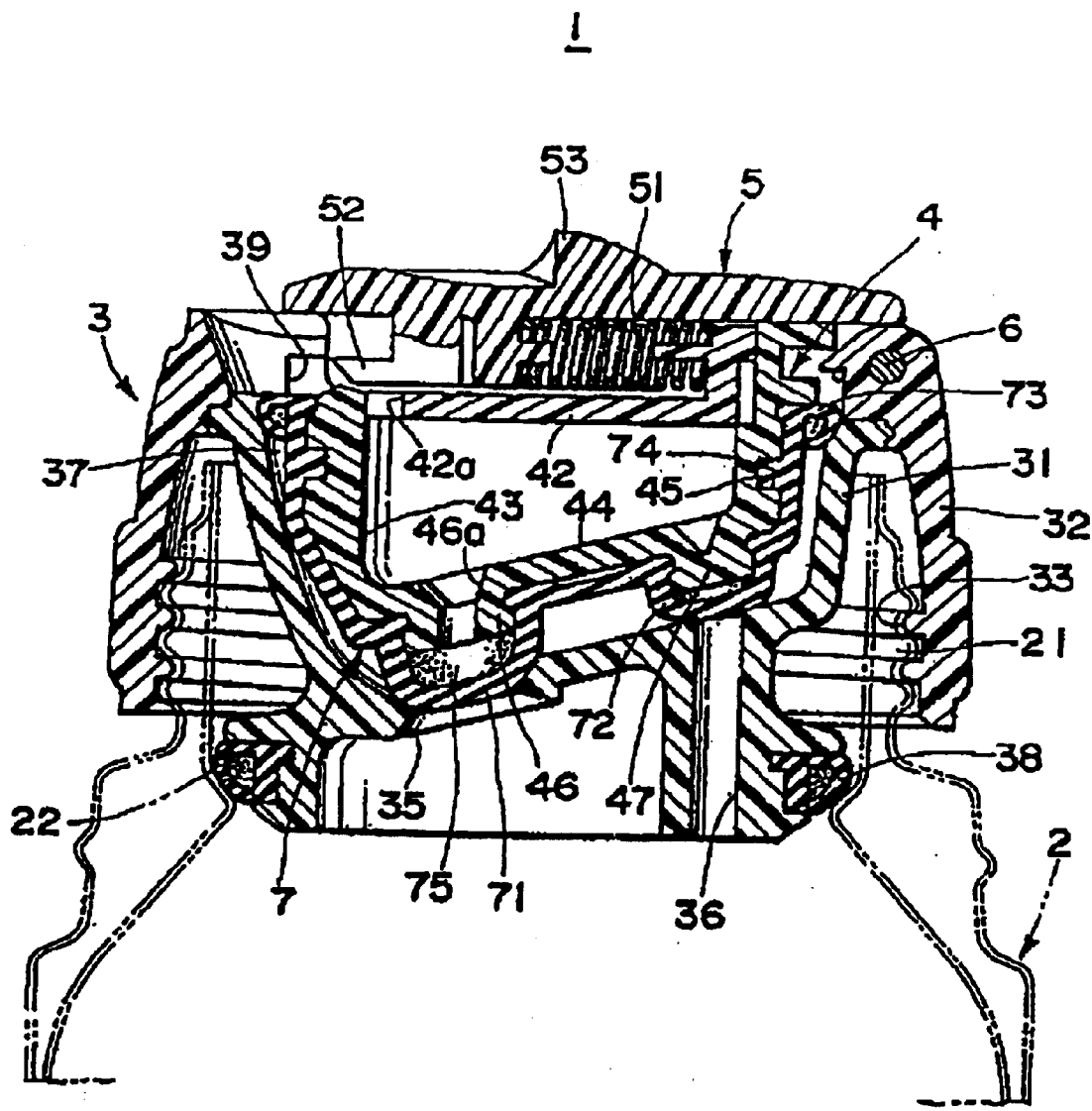
FIG. 3 is a cross-sectional view of the plug in a closed status so that the fixing device does not fix the inner plug onto the outer plug according to one preferred embodiment of the invention.
Figure 4:
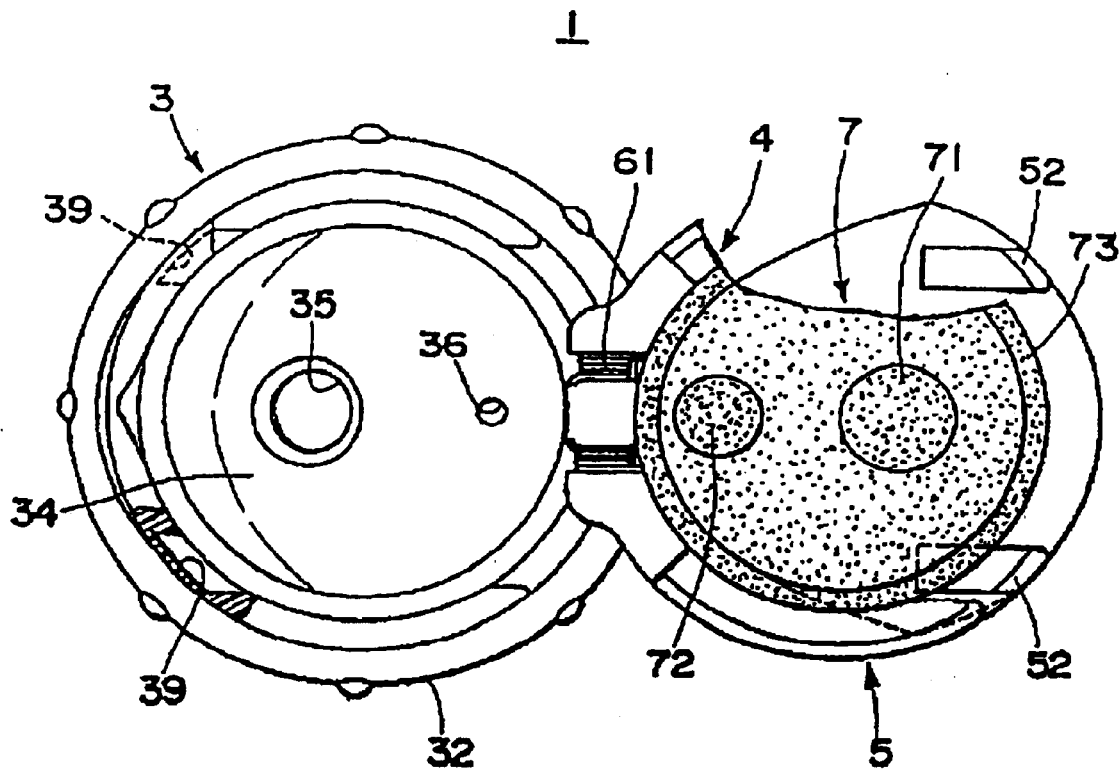
FIG. 4 is a top view of the plug in the open status according to one preferred embodiment of the invention.
Figure 5:
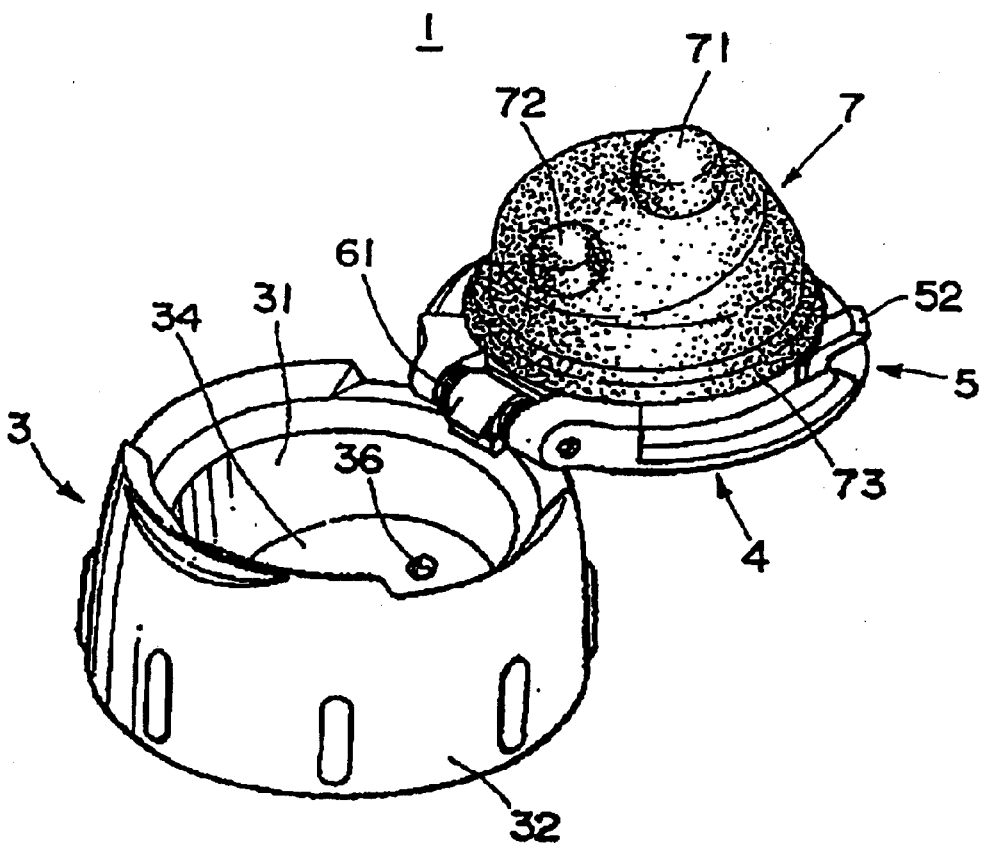
FIG. 5 is a perspective view of the plug in the open status according to one preferred embodiment of the invention.

FIG. 1 is a cross-sectional view of a plug in an open status according to one preferred embodiment of the invention. FIG. 2 is a cross-sectional view of the plug in a closed status using a fixing device to fix the inner plug onto the outer plug. FIG. 3 is a cross-sectional view of the plug in a closed status so that the fixing device does not fix the inner plug onto the outer plug. FIG. 4 is a top view of the plug in the open status according to one preferred embodiment of the invention. FIG. 5 is a perspective view of the plug in the open status according to one preferred embodiment of the invention. Referring to FIGS. 1 to 5, the preferred embodiment is discussed in detail.

As shown in FIG. 1, a plug structure 1 of the present invention, suitably applied for example to a water bottle or a thermos bottle, comprises an outer plug 3, an inner plug 4 and a fixing device 5. The outer plug 3 is detachably mounted onto an upper opening of a liquid container 2. The inner plug 4 is pivotally connected to the outer plug 3, using a hinge 6 such that an upper opening of the outer plug 3 can be opened or closed by rotating the inner plug 4 upwards or downwards around the hinge 6. The fixing device 5 is used to fix the inner plug 4 onto the outer plug 3 to keep the outer plug 3 closed.

The outer plug 3 comprises an outer plug body 31 that is substantially a cylindrical shape with a bottom wall 34 and an installer 32 for detachably mounting to the upper opening of the liquid container 2. The outer plug 3 is mounted onto the liquid container 2 by inserting the outer plug body 31 into the upper opening of the liquid container 2 and then screwing it into a screw thread 21 formed on the outer rim around the upper opening of the container by a screw thread 33 formed on the inner rim of the installer 32. The inner plug 4 is pivotally connected to one side of installer 32 of the outer plug 3 and capable of rotating upwards and downwards through a hinge axis 6 formed on the installer 32, by which a liquid inlet is formed in the plug 1, opposite the hinge axis 6.

The bottom wall 34 of the outer plug body 31 is tilted from the side near the hinge 6 to the side near the liquid inlet. A liquid passage hole 35 is penetrated through the lower portion of the bottom wall 34 and an air hole 36 is penetrated through the higher portion of the bottom wall 34. The space formed between the bottom wall 34 and the upper opening of the outer plug body 31 forms a liquid passage 37. In addition, a ring-shape seal member 38 is formed around the lower rim of the outer plug body 31 whereby the ring-shape seal member 38 can seal a neck portion 22 near the lower end of the opening of the container 2 when the outer plug 3 is mounted onto the liquid container 2.

The inner plug 4 comprises an inner plug body 41 that is substantially a cylindrical shape with a bottom wall 44 and a lid 42 for covering the upper opening of the inner plug body 41. The inner plug body 41 comprises a body 43, a bottom wall 44, and a groove 45 used for installing a seal member and formed around the outer surface of the body 43. The profile of the bottom wall 44 is substantially the same as the profile of the bottom wall 34 of the outer plug 3. Protrusions 46, and 47 are used as seal members and formed on the bottom wall 44 of the inner plug 4 and are positioned corresponding to the liquid passage hole 35, and the air hole 36 respectively. A ventilator hole 46a is penetrated through the protrusion 46 positioned corresponding to the liquid passage hole 35. A ventilator hole 42a is formed on the lid 42.

An elastic seal member 7, such as an elastomer, covers the inner plug body 41. The elastic seal member 7 comprises a liquid inlet seal member 71 for sealing the liquid passage hole 35, an air hole seal member 72 for sealing the air hole 36, and a liquid outlet seal member 73 for sealing the inner wall near the upper opening of the outer plug 3. The seal members 71, 72 and 73 can be integrally formed. The liquid inlet seal member 71 and the air hole seal member 72 are embedded onto the protrusions 46, 47 respectively, and a protrusion ring 74 is embedded to the groove 45 for mounting the elastic seal member 7 onto the inner plug body 41. A hole 75 is formed between the liquid inlet seal member 71, and the protrusion 46. In the preferred embodiment, the seal members 71, 72 and 73 are integrally formed, but they can be formed separately.

The fixing device 5 is installed on the lid 42. The fixing device 5 has a fixing claw 52 protruding from the outer wall toward the liquid. inlet of the inner plug body 41, whereby the fixing claw 52 can be fixed into a fixing hole 39 formed on inner wall toward the liquid inlet of the outer plug body 31. As shown in FIG. 3, the fixing claw 52 extends, and moves back and forth along a direction from the hinge 6 to the liquid inlet. A coil spring 51 is installed between the sidewall of the lid 42 and the fixing device 5, and generates a resilient force toward the liquid inlet. An operation device 53 is formed on the fixing device 5, which can be protruded from the fixing device 5.

When the inner plug 4 closes the outer plug, the fixing claw 52 of the fixing device 5 is inserted into the fixing hole

39 such that the inner plug 4 can keep the outer plug 3 closed. In addition, against the resilient force generated by the coil spring 51, the operation device 53 moves toward the hinge 6 and therefore the fixing claw 52 shrinks into the inner plug body 43 such that the fixing claw 52 and the fixing hole 39 are disengaged. As shown in FIG. 4, a torsion spring 61 is installed on the hinge for connecting the hinge 6 and the inner plug 4. Therefore, the inner plug 4 can be pivotally rotated above the outer plug 3 with respect the hinge 6 due to the resilient force of the torsion spring 61. As shown in FIGS. 1 and 2, the open status and the close status deviate from each other about 180 degrees centered at hinge 6. Due to the resilient force of the torsion spring 6, when the container 2 is tilted for pouring liquid, the inner plug 4 can keep the open status and prevent the inner plug 4 from closing.

As described above, the inner plug 4 is pivotally rotated for opening or closing the liquid passage 37 formed between the upper opening, and the bottom wall 34 of the outer plug 3. According to the invention, no complex seal mechanism and mechanism for opening and closing the plug 1 is formed inside the outer plug 3, and no liquid passage is formed inside the inner plug 4. Furthermore, because the inner plug 4 can be fully opened, and the opening status can be exactly confirmed and therefore the liquid passage 37 can be cleaned up completely. In addition, because no mechanism for opening and closing the plug 1 is formed around the liquid passage 37, the liquid in the container will not flow into the opening and closing mechanism, and liquid to clean up the opening and closing mechanism will not flow into the container 2. Moreover, due to the elasticity of the seal members 71, 72 and the torsion spring 61, even though the pressure in the container 2 is lower than the pressure outside the container 2, the inner plug 4 can be easily opened.

Furthermore, because the liquid passage hole 35 penetrated through the bottom wall 34 of the outer plug 3 is sealed using the seal member 71 by pivotally rotating the inner plug 4, the size between the bottom wall 34 and the upper opening of the outer plug 3 can be reduced. The operation of the fixing device 5 for opening or closing the inner plug 4 is performed along a direction from the hinge 6 to the liquid inlet, i.e., a lateral direction. Accordingly, the overall height of the plug 1 is lower than the conventional plug structure. In addition, the inner plug 4 is pivotally rotated upwards to open, and therefore, even if the pressure in the container 2 is higher than the pressure outside the container 2, the inner plug 4 can be also easily opened. Moreover, because the hole 75 is connected the atmosphere, the operation for opening and closing the inner plug is eased.

By means of the inner plug 4 being pivotally rotated up and down above the outer plug 3, the mechanism for opening or closing the upper opening of the outer plug 3 is simplified. When the outer plug 3 is closed by the inner plug 4, the liquid inlet hole 35, and the air hole 36 are respectively sealed by the seal members 71, 72 and the inner wall of the upper opening of the outer plug body 31 serving as the entrance of the liquid passage 37 is sealed by the seal member 73. Therefore, the inlet and outlet of the liquid passage 37 can be prevented from leaking. The water cut-off mechanism for the inlet and outlet of the liquid passage 37 is airtight, and therefore, serves to thermally isolate the inlet and outlet of the liquid passage 37 allowing the liquid temperature to be efficiently maintained. Furthermore, the inlet seal members 71 for sealing the liquid passage hole 35 has a hole 75 therein, and because the hole 75 can be connected to the atmosphere through the ventilator hole 46*a* in the protrusion 46 and the ventilator hole 42*a* in the lid 42, the pressure can be easily adjusted while the outer plug 3 is closed by the inner plug 4. Accordingly, even though the pressure in the container 2 is higher than the pressure outside the container 2, the hole 75 is easily deformed such that the liquid inlet hole 35 can be completely sealed by the seal member 71.

In summery, according to the plug for the liquid container of the invention, the plug comprises an outer plug that is substantially a cylinder shape with a bottom wall. The plug can be detachably mounted onto the liquid container and the bottom wall of the outer plug is tilted. A liquid passage hole and an air hole are formed through the bottom wall, and are respectively located at a lower position and a higher position of the bottom wall. A liquid passage is formed between the bottom wall and the upper opening of the outer plug. The inner plug is pivotally connected to the outer plug by a hinge and capable of rotating upwards and downwards around the hinge over the outer plug, and comprises seal members thereon for sealing the liquid inlet hole and the air hole respectively. The fixing device can move back and forth on the inner plug for securing the inner plug to the outer plug. Because no seal members and opening/closing mechanism are formed in the outer plug and no liquid passage is formed in the inner plug, the liquid passage can be efficiently cleaned up. In addition, because no opening/closing mechanism is formed in the liquid passage, the liquid in the container does not flow into the opening/closing mechanism. Furthermore, during cleaning, the liquid poured into the opening/closing mechanism for cleaning is not mixed with the liquid in the container 2.

In addition, according to the plug for the liquid container of the invention, the plug comprises an outer plug that is substantially a cylinder shape with a bottom wall. The plug can be detachably mounted onto the liquid container and a liquid passage hole is formed through the bottom wall. A liquid passage is formed between the bottom wall and the upper opening of the outer plug. The inner plug is pivotally connected to the outer plug by a hinge and capable of rotating upwards and downwards around the hinge over the outer plug 3, and comprises seal member thereon for sealing the liquid passage hole from above. Because the fixing claw is installed on the inner plug and moved back and forth along its protruding direction, the size formed between the bottom wall and the upper opening of the outer plug can be reduced. In addition, the fixing device is operated laterally, and therefore the overall height of the plug is lower than the conventional plug whereby the plug height is reduced such that the liquid container becomes more compact. Even if the pressure in the container is higher than the pressure outside the container, the inner plug still can be easily opened because the inner plug is pivotally rotated to open.

Furthermore, according to the plug for the liquid container of the invention, the plug comprises an outer plug that is substantially a cylinder shape with a bottom wall, an inner plug pivotally connected to the outer plug through a hinge for opening or closing the outer plug, and a fixing device for fixing the inner plug onto the outer plug. A liquid passage hole is penetrated through the bottom wall, and a liquid passage is formed between the bottom wall and an upper opening of the outer plug body. Because the inner plug comprises a liquid inlet seal member for sealing the liquid passage hole and a liquid outlet seal member for sealing the inner wall of the upper opening of the outer plug, the inlet and outlet of the liquid passage can be sealed from leakage by using a simple mechanism whereby the inner plug is pivotally rotated to open and close the outer plug. The water cut-off mechanism for the inlet and outlet of the liquid passage becomes a thermal isolation region between the inlet and outlet of the liquid passage whereby the liquid temperature can be efficiently maintained. Furthermore, because the hole formed between the seal member and the inner plug can be connected to the atmosphere, the pressure can be easily adjusted while the outer plug is closed. Therefore, even though the pressure in the container is higher than outside, the hole is easily deformed such that the liquid inlet hole can be completely sealed by the seal member.

What is claimed is:

1. A plug for a liquid container, comprising:

an outer plug body in a shape of a cylinder with a bottom wall and detachably installed onto an opening of a liquid container, wherein a liquid passage hole penetrates through the bottom wall and a fixing hole is formed at one side of the outer plug body;

an inner plug body in a shape of a cylinder pivotally connected to the outer plug body through a hinge at another side of the outer plug body opposite to the fixing hole for opening or closing the outer plug body, wherein the inner plug body further comprises a seal member thereon for sealing the liquid passage hole; and a fixing device for fixing the inner plug body into the outer plug body, wherein the fixing device protrudes from a sidewall of the inner plug body, and has a fixing claw for fixing into the fixing hole of the outer plug body, wherein the fixing device is formed on the inner plug body and moves back and forth in a direction of the protrusion of the fixing device to fix the inner plug body into the outer plug body.

2. A plug for a liquid container, comprising:

an outer plug body in a shape of a cylinder with a bottom wall and detachably installed onto an opening of a liquid container, wherein a liquid passage hole penetrates through the bottom wall;

an inner plug body in a shape of a cylinder pivotally connected to the outer plug body through a hinge for opening or closing the outer plug body;

a seal member coupled to the inner plug body for sealing the liquid passage hole, wherein a hole between the seal member and the inner plug body connects to the outer atmosphere; and a fixing device for fixing the inner plug body into the outer plug body, wherein the fixing device protrudes from a sidewall of the inner plug body, and has a fixing claw for fixing into a fixing hole of the outer plug body, wherein the fixing device is formed on the inner plug body and moves back and forth in a direction of the protrusion of the fixing device to fix the inner plug body into the outer plug body.

* * * * *